United States Patent [19]

Demesmaeker et al.

[11] Patent Number: 5,455,391
[45] Date of Patent: Oct. 3, 1995

[54] CABLE SEALING

[75] Inventors: Marc Demesmaeker, Antwerpen;
Lodewijk C. M. Van Noten, Leuven;
Filip Vandeputte, Linden, all of Belgium

[73] Assignee: N.V. Raychem S.A., Kessel-Lo, Belgium

[21] Appl. No.: 157,162

[22] PCT Filed: May 28, 1992

[86] PCT No.: PCT/GB92/00962

§ 371 Date: Dec. 3, 1993

§ 102(e) Date: Dec. 3, 1993

[87] PCT Pub. No.: WO92/22114

PCT Pub. Date: Dec. 10, 1992

[30] Foreign Application Priority Data

Jun. 6, 1991 [GB] United Kingdom ............ 112181

[51] Int. Cl.[6] ..................................... H02G 15/04
[52] U.S. Cl. ..................... 174/93; 174/77 R; 174/92
[58] Field of Search .................. 174/93, 92, 77 R

[56] References Cited

U.S. PATENT DOCUMENTS

| 3,569,608 | 3/1971 | Ance | 174/93 |
|---|---|---|---|
| 3,665,907 | 4/1972 | Philibert et al. | 174/77 R |
| 3,676,387 | 7/1972 | Lindlof | 260/28.5 B |
| 3,827,999 | 8/1974 | Crossland . | |
| 4,176,240 | 11/1979 | Sabia | 174/23 C |
| 4,267,401 | 5/1981 | Wilkinson | 174/77 R |
| 4,369,284 | 1/1983 | Chen | 524/476 |
| 4,512,219 | 4/1985 | Janssen | 81/121.1 |
| 4,600,261 | 7/1986 | Debbaut | 174/76 |
| 4,610,738 | 9/1986 | Jervis | 156/49 |
| 4,622,436 | 11/1986 | Kinnan | 174/77 R |
| 4,736,071 | 4/1988 | Hawlins et al. | 174/92 |
| 4,859,809 | 8/1989 | Jervis | 174/92 |
| 4,886,939 | 12/1989 | Kinnan | 174/77 R |
| 5,006,669 | 4/1991 | Bachel et al. | 174/93 |
| 5,007,701 | 4/1991 | Roberts | 174/77 R |
| 5,313,019 | 5/1994 | Brusselmans et al. | 174/93 |

FOREIGN PATENT DOCUMENTS

| 1500900 | 7/1969 | Germany . | |
|---|---|---|---|
| 1640719 | 8/1970 | Germany | 174/93 |
| 150818 | 9/1981 | Germany | 174/93 |
| WO90/05401 | 5/1990 | WIPO . | |

Primary Examiner—Morris H. Nimmo
Attorney, Agent, or Firm—Herbert G. Burkard; William D. Zahrt, II; A. Stephen Zavell

[57] ABSTRACT

A device for sealing an article, which comprises:
(i) a sealing material;
(ii) a resilient member that can be biased to apply compression to the sealing material to cause it to seal the article; and
(iii) stop means for limiting said biasing of the resilient member at a configuration thereof in which said biasing can be increased by movement of the sealing material.

22 Claims, 2 Drawing Sheets

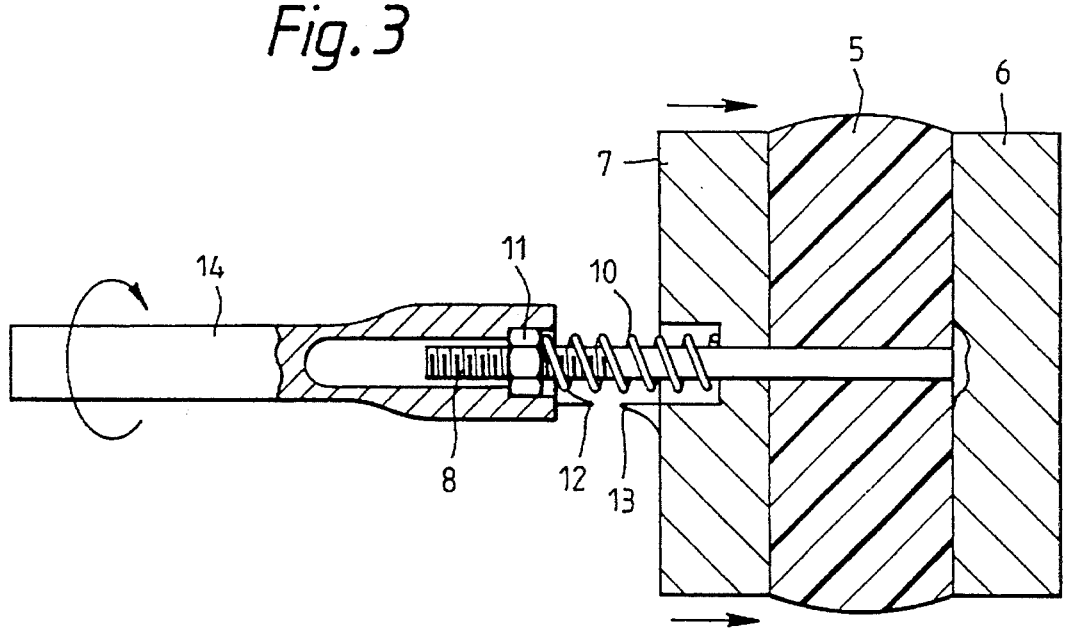

CABLE SEALING

The present invention relates to a cable seal, and in particular to a telecommunications cable splice case.

Cable splice cases have the following function. Where a cable splice is to be made, cable jackets have to be stripped back from the cable ends in order to connect the internal conductors. Once the conductors have been connected, the environmental protection previously provided by the cable jacket has to be made good across the splice in order to prevent corrosion or other damage of the conductors and connectors. This is done by building a so-called splice case across the splice from intact cable jacket of the incoming cable to intact cable jacket of the outgoing cable.

For many years now such cable splice cases have been made by positioning a heat-shrinkable sleeve, internally-coated with a hot-melt adhesive, around the splice, and heating it. Heat causes the adhesive to become activated and the sleeve to shrink into tight engagement around the incoming and outgoing cables.

A disadvantage of heat-shrinkable sleeves, however, is that an open-flame torch is generally needed to install them and they can be difficult to re-enter (by which is meant removal of the splice case to gain access to the splice without damaging the splice). Effort has recently been directed towards designing a splice case that avoids the need either to heat-shrink a sleeve or to heat-activate an adhesive. Proposals have been made for splice cases etc. that employ gels that can be installed at room temperature.

Where a seal is to be made using a gel or other suitable sealing material some force, generally compression of the sealing material, must be applied to keep the material against the substrate to be sealed. The force should be great enough to overcome any forces, such as a head of water, or mere capillary forces, tending to separate the material from the substrate.

The requirement for a force on a sealing material was recognized in U.S. Pat. No. 4,600,261 (Raychem) which discloses an apparatus and method for protection of electrical contacts. The protection apparatus includes a gel, first means to contain the gel, second means to retain the gel within the first means, and a force means which acts on the first means so that the gel is maintained in compressive contact with the electrical contacts and substantially encapsulates a conductive portion of them. That apparatus is of particular use in sealing a telecommunications terminal block.

Various specific devices for sealing using a gel under compression, within the general idea of U.S. Pat. No. 4,600,261, have been proposed. One such specific idea is disclosed in WO90/05401 (Raychem). In that specification, sealing is provided, at least in some embodiments, by a gel having an elongation of at least 100% and a compression set of 70° C. of less than 30%. The gel is put under compression to seal an annular gap between the cables to be sealed and a surrounding housing. The gel is trapped between two end pieces that form a structural member, one such structural member being provided at each end of a cable splice. A central housing is provided spanning the splice from one of the structural members to the other. The two end pieces (of each member) are forced together to deform the gel between them. The gel is displaced radially to seal between the cables and the structural members, and also between the structural members, and the surrounding housing. The end pieces are forced together by means of a nut and bolt, the bolt carrying a coil compression spring driven by the nut. The force on the end pieces is thus spring loaded. Some displacement of the gel over time can thus occur, with the compressive force being maintained.

Other prior art disclosure of force being applied to a sealing material is made in U.S. Pat. No. 4,859,809 (Raychem), U.S. Pat. No. 4,610,738 (Raychem) and U.S. Pat. No. 4,736,071 (ATT and Bell Laboratories).

A problem may, however, arise with such prior art means for pressurizing a sealing material. In some instances the force applied by a spring and the displacement of sealing material that can be accommodated is fixed. A simple spring is provided that is either installed or it is not installed. As a result, tolerances in the size of a containment means for the sealing material, in the amount of sealing material, and in the size of the substrate must be kept small. Also, creep or stress-relaxation of the sealing material can be accommodated only to a small extent.

In other instances, such as certain embodiments of WO90/05401, adjustment of the compressive force is possible (for example by the nut and bolt described) but it might be difficult for the installer to know when he has tightened it enough. In general it will not be acceptable to instruct him to tighten it until the spring bottoms out. That could deal with the problem of accommodating subsequent creep of sealing material, since the spring can of course relax, but it would not allow accommodation of an increase in pressurization of the sealing material during service due for example to thermal expansion. If the spring had been bottomed out, there would then be a rigid (i.e. not resilient) connection through the containment means for the sealing material.

We have now realised that what is desirable is a containment means for a sealing material that can be resiliently biassed to subject a sealing material to compression, and that the biassing means be provided with a stop such that resilient movement is subsequently possible, preferably in each of two directions.

Thus, the invention provides a device for sealing an article, which comprises:

(i) a sealing material;

(ii) a resilient member that can be biassed to apply compression to the sealing material to cause it to seal the article; and (iii) stop means for limiting said biassing of the resilient member at a configuration thereof in which said biasing can be increased by movement of the sealing material.

Using such a device the installer can tighten the resilient member until he feels a stop, knowing that the correct degree of tightening has been applied. Displacement of sealing material will subsequently be able to be accommodated in, preferably, each of two directions for example that of the material creeping away under the applied bias, and that which results from, say, thermal expansion. When we refer to a stop, we do not of course mean that further biassing is impossible under any force; we merely mean that the stop is apparent to the installer and indicates to him that he should bias no more. In general the stop will be apparent as a sudden increase in the force required to continue biassing.

The stop may comprise a detent, made for example of a plastics material, that engages after a certain amount of biassing. Parts of the detent may be shaped such that they abut and catch when approaching each other from one direction, but are able to ride over one another when approaching from another direction. In this way over-tightening (which may be possible but require considerable force) can be easily rectified. This may be achieved by providing one detent part with two faces one perpendicular to the other part and one face oblique to it.

The resilient member preferably comprises a spring, particularly a coil spring, especially a compression spring.

The device of the invention preferably additionally comprises means (iv) for biassing the resilient member, and such means (iv) preferably operates by means of a screw thread, particularly as a nut and bolt. Other means operating by for example rotation may, however, be used.

The nut and bolt preferably bring together two end pieces between which is positioned the sealing material. The bolt preferably carries a coil spring, one end of which bears against one of the end pieces and the other end of which is driven by advancing the nut along the bolt.

In such an embodiment the stop means may limit rotation of the biassing means (iv), preferably limiting it with respect to some structural member, such as the end pieces referred to above, that at least partially retains the sealing material.

To accommodate movement of the sealing material we prefer that the stop means is such that translation of the structural member towards means (iv) is possible after full relative rotational movement between them, in the direction of increasing bias, is reached.

The device of the invention is preferably used to form at least part of a cable splice case. In particular, an assembly may be provided for forming a cable splice, which comprises:

(i) a first device of the invention, (ii) a second device of the invention, and (iii) a cover, preferably of wraparound design, having two open ends within each of which can be positioned respectively the first and second devices.

In this way, an in-line splice case can be made. Either or each of the first and second devices may accommodate more than one cable in order that a branched cable splice be sealed.

A butt splice can be sealed in a similar way. Here a single device of the invention can be used at an open end of a cover (preferably dome shaped) having a single open end.

Both a structural member and a sealing material are required for environmental sealing because, of course, neither can do the job alone: the structural member can not itself reliably seal to the cable without difficulties in installation and close tolerances in manufacture, and a sealing material does not have the strength to provide an entire splice closure. We prefer that the structural member (which may comprise two or more parts) not only provides some of the closure, but also serves to retain, and if need be deform by pressurizing etc, the sealing material.

In particular we prefer that the structural member be at least partially hollow, the sealing material being provided partially within the hollow and partially extending from it to seal any gap between the member and the cable.

The structural member or the end pieces that comprise it may comprise simple plates with holes for the cables, or they may have more complex construction. In particular, they are preferably of wrap-around design. For example, the structural member may comprise an inner part and one or more outer parts that can form at least part of an annulus around the inner part, leaving between them a hole through which the cable can pass.

The sealing material preferably comprises a gel. We prefer a liquid-extended polymer composition preferably having a cone penetration value (measured by a version of ASTM D217) within the range from 30–400 ($10^{-1}$ mm); an ultimate elongation (measured by ASTM D412) greater than 100% with substantial elastic deformation to an elongation of at least 100%. Two or more gels or other materials of different properties may be used together, for example a softer gel to provide a seal and a harder gel to locate the softer gel and to apply pressure to it.

Gels may be made from a variety of materials, for example oil extended polyurethanes or from silicones. We prefer, however, oil-extended block copolymers. Reference may be made to U.S. Pat. No. 3,676,387 (Lindlof), U.S. Pat. No. 3,827,999 (Crossland), U.S. Pat. No. 4,176,240 (Sabia), U.S. Pat. No. 4,369,284 (Chen), and WO 88/00603 (Raychem).

Useful compositions may be made comprising at least 400, preferably at least 500, more preferably at least 700, especially 650–750 parts by weight of an extender liquid such as a plasticizing oil per 100 parts by weight of a block copolymer. Preferred block copolymers comprise hard and elastomeric blocks, and suitable polymers comprise styrene-ethylenebutylene-styrene tri-block copolymers. Suitable examples are marketed by Shell under its trademark Kraton, in particular Kraton G1651. Other block copolymers may be used, and in general we prefer a polymer having hard and elastomeric blocks and having a molecular weight from 250,000 to 270,000. Further details of preferred materials may be obtained from WO 90/05401 (Raychem), the disclosure of which is incorporated herein by reference.

The invention is further illustrated by the accompanying drawings, in which:

FIGS. 1 or 2 show prior art sealing means; and

FIG. 3 shows a device of the invention.

Figure 1:
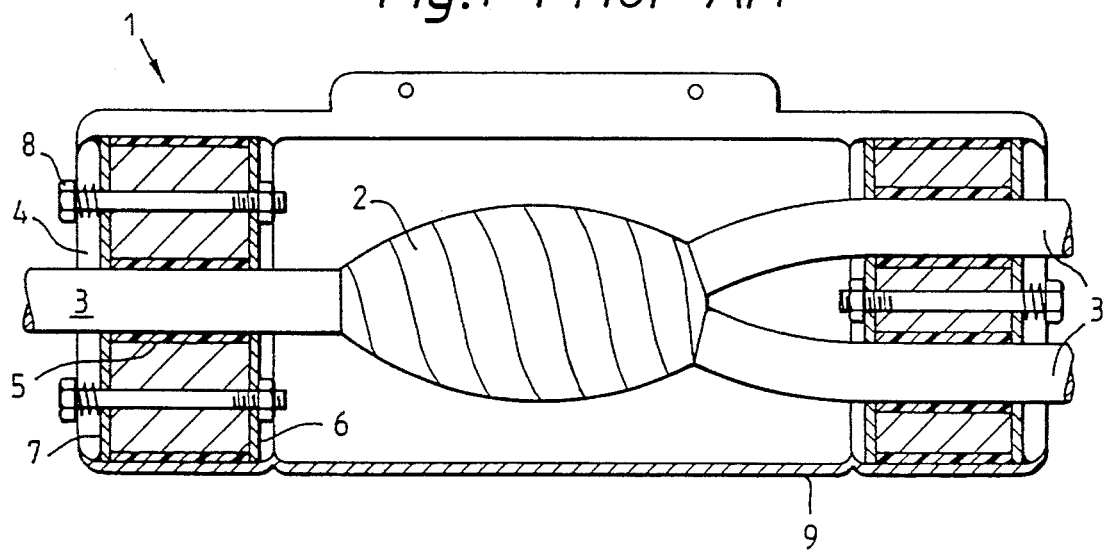
FIGS. 1 and 2 illustrate the prior art and are taken from WO 90/05401 (Raychem).
Figure 2:
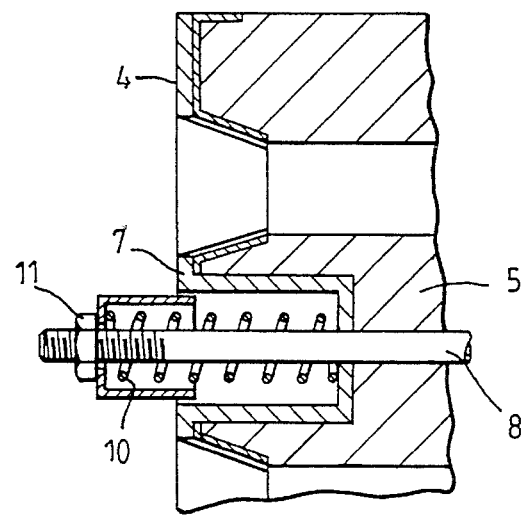

In FIG. 1 a splice case 1 has been installed around a splice 2 between telecommunications cables 3. Seals at each end of the splice case are formed from a structural member 4 and a sealing material 5, such as a gel. The structural member may comprise first and second end pieces 6, 7 between which is positioned a sealing material. These end pieces may be brought together by a bolt 8 carrying a spring. The seals at each end of the splice case are bridged by a central part 9.

FIG: 2 shows a detail of a preferred means of putting sealing material 5 under compression. A coil spring 10 carried by bolt 8 is compressed by advancing nut 11 along the bolt. The nut 11 moves one end of the coil spring, and the other end of the spring bears against the end piece 7.

The invention is illustrated in FIG. 3, and it can be used with any suitable embodiment disclosed in WO90/05401 or with any other suitable seal, particularly cables accessory seal, especially for sealing a telecommunications splice.

End piece 7 is biased towards end piece 6, thereby putting sealing material 5 between them into compression. This biassing results from nut 11 being advanced along bolt 8, causing spring 10 to be forced against end piece 7. The screw threads along bolt 8 provide for maintaining a plurality of bias levels.

Stop means 12, 13 are provided to limit rotational motion of the nut 11 with respect to the bolt 8. It can be seen that, even when rotational motion is limited, translational motion between piece 7 and the bolt (and therefore between pieces 6 and 7) is still possible. Each stop means 12 and 13 is tapered on one of its surfaces, allowing rotation in one direction, even after excessive rotation in the other direction.

The nut 11 is mounted in a tool 14 that is elongate and preferably is longitudinally flexible, thus allowing the nut to be turned in conditions of restricted access.

We claim:

1. A device for sealing an article, which comprises:

(i) a sealing material which is configured to be positioned against such an article;

(ii) a resilient member that can be biased to apply compression to the sealing material to cause the sealing material to seal against the article when positioned adjacent thereto; and (iii) stop means for limiting said biassing of the resilient member at a configuration thereof in which said biasing can be increased by movement of the sealing material.

2. A device according to claim 1, in which the resilient member comprises a coil spring.

3. A device according to claim 1 further comprising a first and a second part associated with the resilient member such that movement of the first part resiliently biases the second part, the stop means limits movement of the first part, and the second part applies compression to the sealing material.

4. A device according to claim 1, which additionally comprises:

(iv) means for biassing the resilient member.

5. A device according to claim 4, in which the means (iv) for biassing can maintain each of a plurality of bias levels.

6. A device according to claim 5, in which the means (iv) for biassing can apply bias progressively over a range of bias levels.

7. A device according to claim 4, in which the means (iv) for biassing operates by means of a screw thread.

8. A device according to any of claim 4, in which the means (iv) for biassing operates by rotation thereof.

9. A device according to claim 8, in which the stop means limits rotation of said means (iv).

10. A device according to claim 1, which additionally comprises:

(v) A structural member that at least partially retains the sealing material and via which the resilient member applies compression to the sealing member.

11. A device according to claim 4, in which:

the means (iv) for biassing operates by rotation thereof;

the stop means limits rotation of said means (iv); and the stop means is carried by the structural member and thereby limits rotation of the means (iv) with respect to the structural member.

12. A device according to claim 11, in which said stop means is such that translation of the structural member towards means (iv) is possible after full relative rotational movement between them, in a direction increasing said bias, has been reached.

13. A device according to claim 12, in which the stop means does not limit rotational movement between the structural member and the means (iv) in a direction decreasing said bias.

14. A device according to claim 10, in which the structural member comprises two end pieces between which is positioned the sealing material, the resilient member, when biassed, forcing the end pieces towards one another.

15. A device according to claim 14, in which the two end pieces are forced together by means of a nut and bolt, the bolt carrying a spring one end of which bears against one of the end pieces and the other end of which is driven by advancing the nut along the bolt.

16. A device according to claim 15, in which one of the end pieces carries a bolt that extends from that end piece through the other end piece, the spring comprising a compression spring carried on a part of the bolt that extends past the other end piece.

17. A device according to claim 16, in which the nut is provided as part of a tool that is elongate in the axial direction of the nut.

18. A device according to claim 17, in which the tool is longitudinally flexible.

19. A device according claim 10, in which the structural member comprises an inner part and one or more outer parts that can form at least part of an annulus around the inner part, leaving a hole between them through which the article can pass.

20. A device according to claim 1, in which the sealing material comprises a gel.

21. An assembly for forming a cable splice which comprises:

(i) a device according to claim 1 and (ii) a cover having an open end within which can be positioned the device (i).

22. An assembly for forming a cable splice, which comprises:

(i) a device according to claim 1, (ii) another device according to claim 1 and (iii) a cover having two open ends within which can be positioned respectively the devices (i) and (ii).

* * * * *